United States Patent [19]

Junger

[11] Patent Number: 6,085,172
[45] Date of Patent: Jul. 4, 2000

[54] METHOD AND APPARATUS FOR EFFICIENT HANDLING OF PRODUCT RETURN TRANSACTIONS

[75] Inventor: Peter Joseph Junger, Redmond, Wash.

[73] Assignee: Nintendo of America Inc., Redmond, Wash.

[21] Appl. No.: 09/065,552

[22] Filed: Apr. 24, 1998

Related U.S. Application Data

[63] Continuation-in-part of application No. 08/725,259, Oct. 2, 1996.

[51] Int. Cl.[7] ........................................... G06F 17/60
[52] U.S. Cl. ................................................ 705/28
[58] Field of Search ........................... 705/1, 28; 707/104

[56] References Cited

U.S. PATENT DOCUMENTS

| | | | |
|---|---|---|---|
| 4,563,739 | 1/1986 | Gerpheide et al. | 705/28 |
| 5,159,560 | 10/1992 | Newell et al. | 364/479 |
| 5,216,612 | 6/1993 | Cornett et al. | 700/96 |
| 5,256,863 | 10/1993 | Ferguson et al. | 705/21 |
| 5,257,741 | 11/1993 | Rode et al. | 241/24.12 |
| 5,311,424 | 5/1994 | Mukherjee et al. | 705/29 |
| 5,478,990 | 12/1995 | Montanari et al. | 235/375 |
| 5,520,990 | 5/1996 | Rotermund | 428/195 |
| 5,602,377 | 2/1997 | Beller et al. | 235/462.15 |
| 5,745,036 | 4/1998 | Clare | 340/572.1 |
| 5,895,453 | 4/1999 | Cook | 705/22 |
| 5,978,774 | 11/1999 | Rogers et al. | 705/24 |
| 5,984,508 | 11/1999 | Hurley | 700/237 |

FOREIGN PATENT DOCUMENTS 845 749 A2  6/1998  European Pat. Off. ........ G06F 17/60

OTHER PUBLICATIONS

Heller, Laura "High cost of returns prompts industry cooperation," Discount Store News, Oct. 1998.
"No more scamming super Mario," Automatice I.D. News, vol. 12, p. 15, Sep. 1996.
Computer City Moves to Consolidate Returns, Computer Retail week, v. 6, n. 125, p. 1 +, Jan. 22, 1996.
Dreamcom web page print out, www.dreamcomdirect.com/RMA.htm, May 25, 1997.
Dilger, Karen A., The Other Direction, Manufacturing Systems, v. 15, n. 10, pp. 12–13, Oct. 1997.
Nintendo Point of Purchase Mail–In Card.
1994 Nintendo Product Returns Policies and Procedures.
1995 Nintendo Product Returns Policies and Procedures.
1996 Nintendo Product Returns Policies and Procedures.
1992 Nintendo Product Returns Policy.

*Primary Examiner*—Edward R. Cosimano
*Assistant Examiner*—William R. McCarty
*Attorney, Agent, or Firm*—Nixon & Vanderhye P.C.

[57] ABSTRACT

A method and apparatus for efficient handling of product returns to reduce associated costs. A computer system at a regional product return center scans a returned product for identifying information, accesses a manufacturer return approval computer system through the internet or the like, and then submits the identifying information to the manufacturer for return approval. The manufacturer computer system utilizes the identifying information to access an electronic registration database to determine whether the returned product satisfies applicable return criteria. If so, the product is approved for return to the manufacturer. The regional product return center preferably scans a plurality of returned products in a single session. In response to the product identifying information submitted by the regional product return center, the manufacturer provides a list of approved returns and unapproved returns, along with a return authorization number for the batch of approved returns. The regional product return center then assembles the approved product returns into a box, shipping pallet, or the like, applies a label indicating the return authorization label, and ships the batch to the manufacturer. Shipping costs can be saved by omitting rejected product returns from the shipment. The manufacturer can handle the approved product returns from the regional return center as a batch, thereby reducing costs.

56 Claims, 8 Drawing Sheets

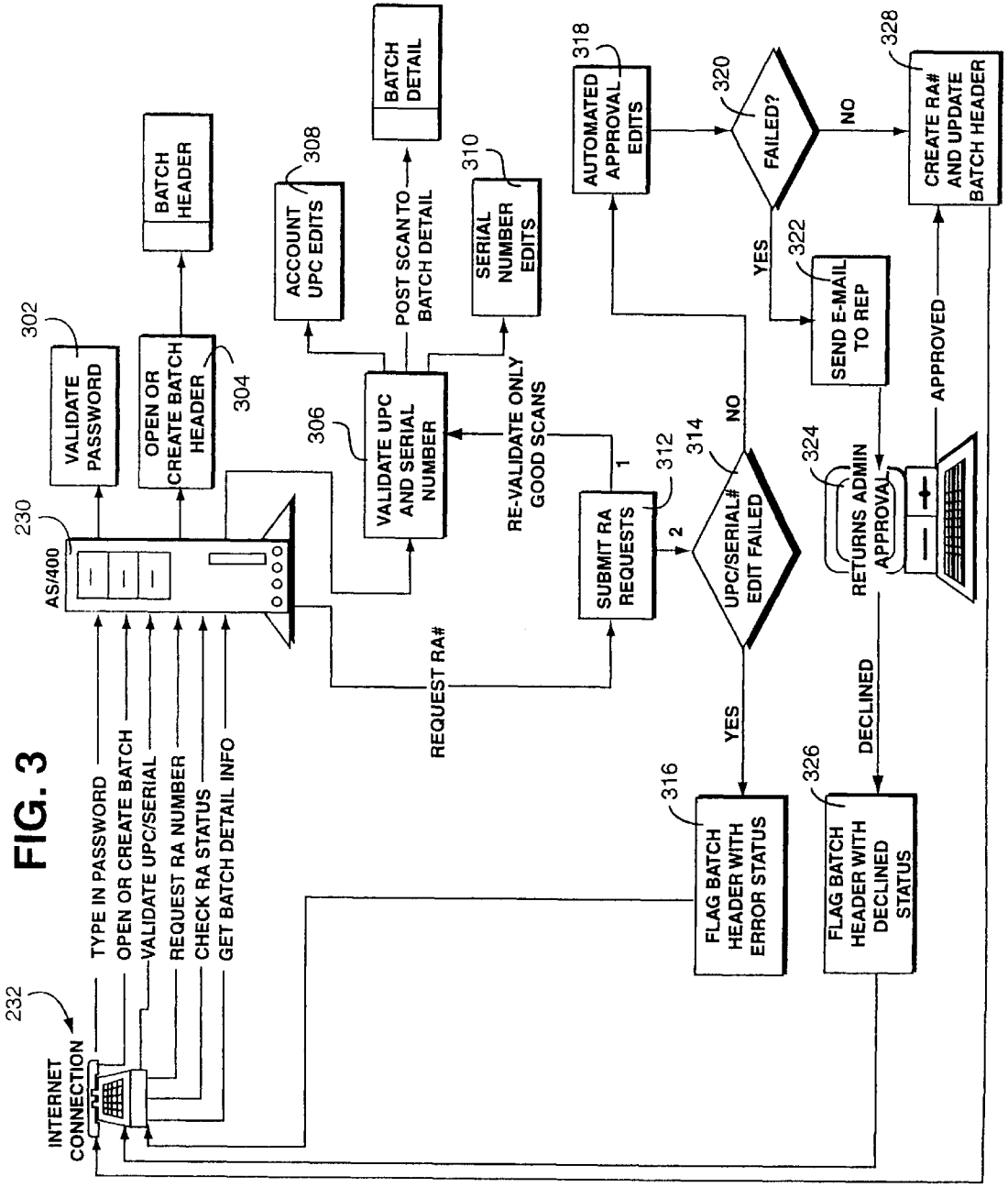

METHOD AND APPARATUS FOR EFFICIENT HANDLING OF PRODUCT RETURN TRANSACTIONS

This application is a continuation-in-part of co-pending, commonly owned application Ser. No. 08/725,259, filed Oct. 2, 1996.

This application is related to co-pending, commonly owned application Ser. No. 09/314,023 filed May 19, 1999, now U.S. Pat. No 5,978,774, which is a continuation of application Ser. No. 08/725,259.

BACKGROUND OF THE INVENTION

1. Field of the Invention

The present invention relates to a method and apparatus for efficient handling of product return transactions. More particularly, the present invention relates to a technique which permits a manufacturer or distributor of commercial products to quickly and inexpensively handle product returns while ensuring that the returned product satisfies applicable criteria for return.

2. Related Art

Product returns are a market reality faced by virtually every manufacturer, distributor, supplier or retailer of commercial products. Unfortunately, handling product returns often requires a significant expenditure of resources. For example, it may be necessary to employ one or more individuals to verify that product returns satisfy the requirements of a company's return policy. Alternatively, a company might choose to avoid the increased overhead associated with additional employees and be somewhat less diligent about verifying compliance with the return policy. However, this alternative can increase costs due to the higher number of improper product returns. Either way, additional costs must either by borne by the company or passed along to the consumer.

In addition to the costs associated with verifying compliance with a return policy, even proper product returns incur additional administrative costs. Examples of such costs include shipping and handling of the returned product, repackaging and redistribution of the returned product (if appropriate), disposal of certain returned products, and the like. These costs must also be borne either by the company or by the consumer in the form of higher prices.

It is, of course, desirable to minimize costs associated with product returns to permit reduced prices to the customer and/or provide improved operating margins for the manufacturer and/or the retailer. There are two major areas in which savings may be realized: (1) reducing the number of improper or fraudulent returns; and (2) improving efficiency and reducing overhead in handling proper returns.

One technique for reducing improper returns is disclosed in commonly owned, co-pending U.S. patent application Ser. No. 08/725,259, filed Oct. 2, 1996, in the names of Philip M. Rogers and Peter J. Junger, which is hereby expressly incorporated by reference in its entirety. Briefly, that application discloses an electronic system for registering product transactions to facilitate compliance with return policies and to reduce improper or fraudulent product returns under warranty. Such an electronic registration system enables individual product identification information to be gathered at the point of a transaction for inclusion in one or more transaction databases. Individual product identification information (such as a serial number) may be stored in a local transaction database along with additional information including at least the date of the transaction. A transaction receipt, such as a customer sales receipt which includes the individual product identification information and the date of the transaction, can be created. Additionally, the individual product identification information and the transaction date may be communicated to a separate location for inclusion in a general transaction database.

Where a serial number is used to identify the individual product, a check digit is preferably used in conjunction with the serial number. In this way, the validity of the serial number can be verified and, if it is invalid, a retail sales clerk or other system operator is prompted to re-enter the serial number. The serial number may be scanned, entered with a keypad, or input with any other suitable technique.

When a customer returns a product with a receipt, a retailer may note the serial number appearing on the receipt and compare it to the returned product. If the serial numbers match and all other return conditions are met, the return may be accepted. When a customer returns a product with no receipt, or a receipt that does not have a correct serial number, the retailer may search the local database for sale information concerning the specific item being returned. If no sale information is located (for instance if another retailer sold the product), the general database may be accessed and searched for sales information, and the return handled accordingly.

This system is helpful in reducing improper or fraudulent product returns and, thus, in reducing costs associated with such returns. Additionally, by reducing the number of improper product returns and automating various product return functions, handling costs associated with product returns are likewise reduced. However, there continues to be a need to further reduce product return costs, particularly costs relating to processing proper product returns. Accordingly, it is a primary object of the present invention to provide a method and apparatus for efficient handling of product return transactions which reduces costs while ensuring against improper product returns.

BRIEF SUMMARY

In accordance with one aspect of the present invention, a computer system at a product return center location obtains identifying information for a product which is to be returned. In the disclosed example implementation, this identifying information is then submitted to a remote return approval computer system through the internet or the like. The return approval computer system may then utilize the identifying information to determine whether the returned product satisfies applicable return criteria. If so, the product is pre-approved for return. The product return location preferably obtains identifying information for a plurality of returned products at a time. In response to the product identifying information submitted by the product return location, the return approval location may provide a list of approved returns and unapproved returns, along with a return authorization number for a batch of approved returns. The product return location may then assemble the approved product returns and ship the batch to the return approval location. Shipping costs can be saved by omitting rejected product returns from the shipment. The return approval location can handle the approved product returns from the regional return center as a batch, thereby reducing costs.

BRIEF DESCRIPTION OF THE DRAWINGS

Various objects, features, characteristics and advantages of the present invention will be more completely understood and appreciated by careful study of the following more detailed description of a presently preferred exemplary embodiment of the invention when read in view of the accompanying drawings, wherein:

FIG. 3 is a data flow diagram illustrating operation of the system of FIG. 2;

DETAILED DESCRIPTION OF A PREFERRED EMBODIMENT

The present invention is described in the context of a particular exemplary embodiment. However, it will be recognized by those of ordinary skill that modification, extensions and changes to the disclosed exemplary embodiment may be made without departing from the scope and spirit of the invention. For instance, although the invention is described primarily in the context of a retailer/manufacturer product return situation, the features, characteristics and advantages of the present invention could likewise be applied to a store/headquarters situation, a retailer/distributor situation, or a distributor/manufacturer situation. Also, it should be appreciated that the term "manufacturer" is used in a broad sense and may include, for example, a supplier of goods that are sold under the supplier's label, but are manufactured by another company on behalf of the supplier. In short, the present invention is not limited to the particular forms disclosed.

Figure 1:
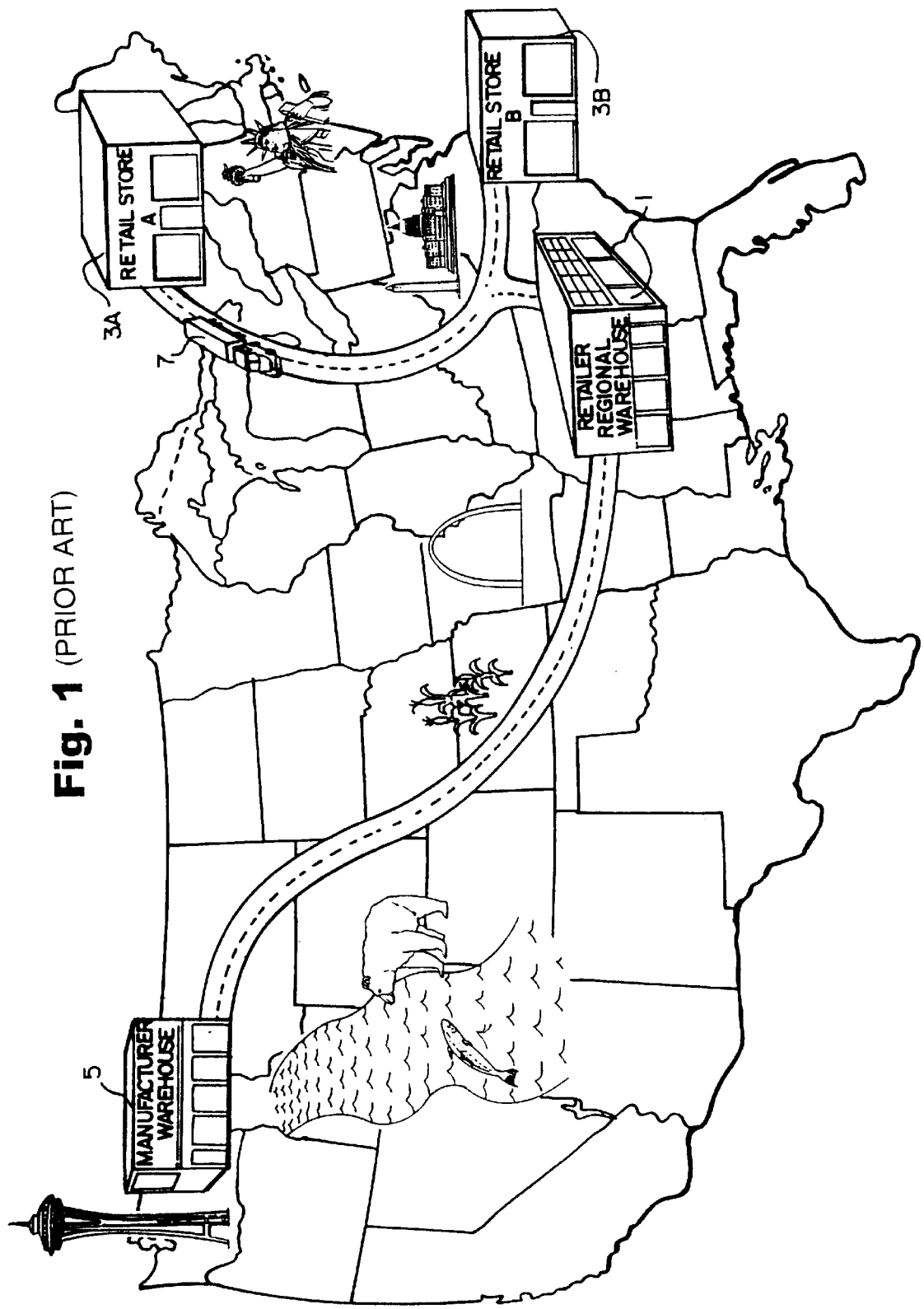
FIG. 1 schematically illustrates a typical arrangement utilized in handling product returns.

Referring now to FIG. 1, an example of a typical arrangement for handling product returns is illustrated. The present invention, of course, is applicable to other arrangements as well. In the example arrangement of FIG. 1, a regional warehouse 1 operated by a large retail chain collects product returns from local retail stores 3A and 3B. In the illustrated example, retail store 3A is located in the Northeast United States and retail store 3B serves the mid-Atlantic region; the retailer regional return center warehouse 1 is located in the South; and the manufacturer warehouse 5 is in the Pacific Northwest. Of course, this example is for illustrative purposes only, and it should be appreciated that other local retail stores, regional return centers, etc. would be present in an actual return network. Also, it should be understood that a product return network typically would be operated in conjunction with a product distribution network.

After the returned products arrive at the regional warehouse 1, they are sorted by manufacturer and/or product, and are shipped from the regional warehouse 1 to the manufacturer warehouse 5 for credit or replacement. The manufacturer then inspects the returned products to ensure that they comply with necessary return conditions and, if appropriate, issues a credit or replacement product.

Each step of the foregoing example return process involves various processing and handling requirements. For example, personnel at the local retail store must first review the product for compliance with applicable return requirements (e.g., ensure that the product is returned within the specified return period and verify that all parts have been returned), and then arrange for shipment to the appropriate regional warehouse by way of a truck 7 or other suitable means of transportation.

Employees at the regional warehouse must unload the products received from the local retail stores, sort them by manufacturer and/or product, prepare them for shipment (e.g., place the returned products on shipping pallets), and arrange for the shipment to the manufacturer. Finally, the manufacturer must receive the returned product shipment, verify that the returns are proper, repackage the returned products if appropriate, and conduct necessary bookkeeping to ensure that the retailer receives proper credit for the return. It is noted that the foregoing is not an exhaustive list of the costs and efforts associated with processing product returns by the retail stores, the regional return center warehouses, and the manufacturers.

The present invention may be utilized, for example, in connection with operations at the retailer regional return center warehouse 1 to reduce costs incurred by both the return center and the manufacturer. In accordance with one aspect of the present invention, significant cost savings can be realized by reducing or eliminating unnecessary shipping costs by making a relatively early determination whether a product return will ultimately be accepted by the manufacturer or the like. If not, the returned product need not be handled further, thereby reducing costs.

In accordance with another aspect of the present invention, advance return authorization may be obtained for a plurality of products at one time to establish an approved product return batch. The approved batch may be properly labeled prior to return to the manufacturer. In this way, product returns may be easily and efficiently handled in batches rather than as individual units, thereby improving efficiency and reducing costs.

Figure 2:
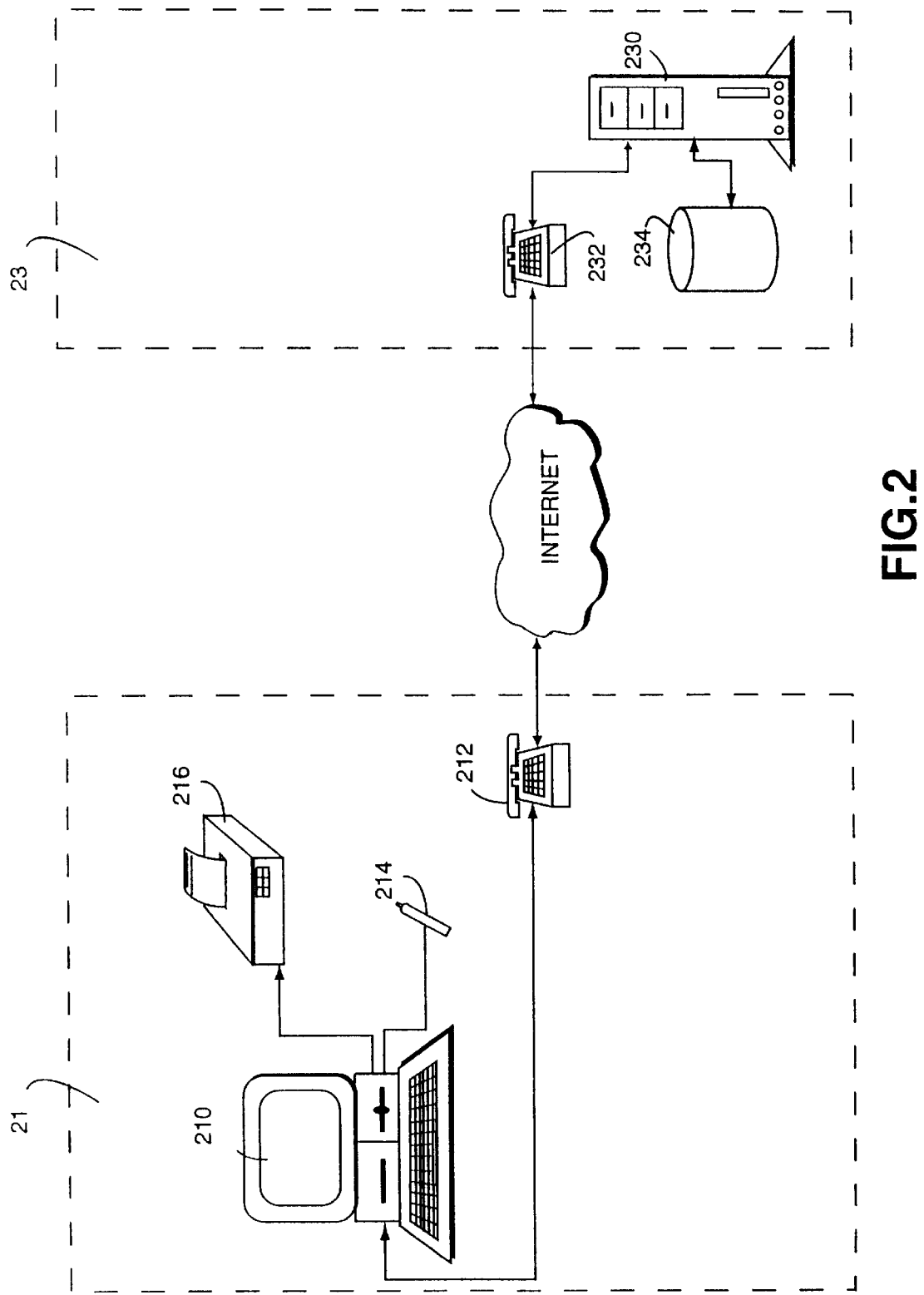
FIG. 2 is a schematic diagram illustrating components which may be used in connection with a preferred example implementation of the present invention.

Referring now to FIG. 2, an example implementation of the present invention includes a return side portion 21 and a manufacturer side portion 23 which are operable to communicate over an internet connection 25. Briefly, the return side portion 21 may include a personal computer 210 that includes, for example, an Intel 486 processor or higher with at least 16 MB of RAM, a Microsoft Windows 95 or Windows NT operating system, and browser software such as Netscape Navigator 4.0 or higher. The personal computer may also include a modem for direct connection to an internet provider through a dedicated telephone connection 212. Alternatively, an internet connection may be made by the personal computer 210 over a corporate network. Also, it may be possible to utilize a direct telephone link by modem between the return side portion 21 and the manufacturer side portion 23 or even a hardwired connection.

A bar code scanner 214 is provided for scanning bar coded SKU and, possibly, serial numbers for returned products. Additionally, a printer 216 is provided for printing transaction records and, if desired, printed versions of return authorizations from the manufacturer. As will be discussed below in greater detail, manually prepared return authorization forms may be used as an alternative to printed return authorizations.

The manufacturer side portion 21 includes a computer system 230 utilizing, for example, an IBM AS/400 computer and having an associated data storage unit 234 for storing an electronic product registration database. The manufacturer side computer system 230 is capable of communicating with the return side portion 21 over an internet connection though telephone connection 232. As noted previously, other communication techniques between the manufacturer side portion 23 and the return side portion 21 may also be utilized.

After the regional retailer return facility receives products for return to the manufacturer, the return side portion 21 may access the manufacturer side portion 23 to screen the products for compliance with return requirements and to obtain pre-authorization of the returns. In particular, the return side computer 210 connects to the manufacturer side computer 230 by way of the internet or through other appropriate communication techniques. In the present example embodiment, the manufacturer side computer maintains a world wide web page for access by the regional return center. Password protection may be provided to ensure only authorized retailers are able to access return pre-authorization features in accordance with the present invention. For example, each return center location that is permitted access to the pre-authorization features may be assigned a location identification code and a password. In such a case, both the location identification code and the password would be required before access is granted to the product return screening program.

Figure 4A:
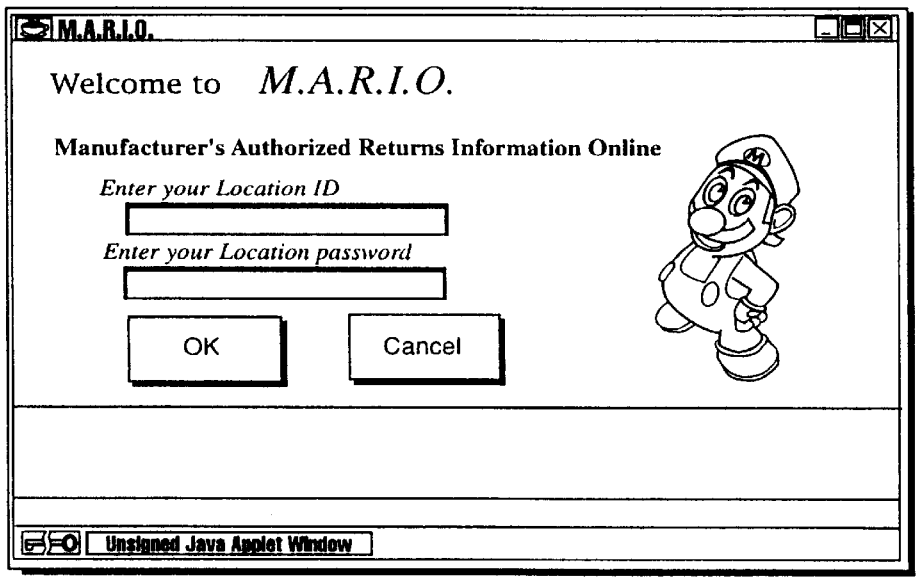
FIGS. 4A through 4H illustrate various user interface screen displays which may be used in connection with an example implementation of the present invention.

FIG. 3 is a logic flow chart for the manufacturer side computer 230 in screening returned products and processing pre-authorization requests from the regional return center. As indicated in the top portion of FIG. 3, the user first enters the appropriate location identification code and password. FIG. 4A illustrates a screen which may be displayed at the return side computer to prompt the user to enter the location identification and password. Once this information is received by the manufacturer side computer, the password is validated at function block 302. If desired, appropriate application maintenance procedures may be implemented upon validation of the password.

Figure 4B:
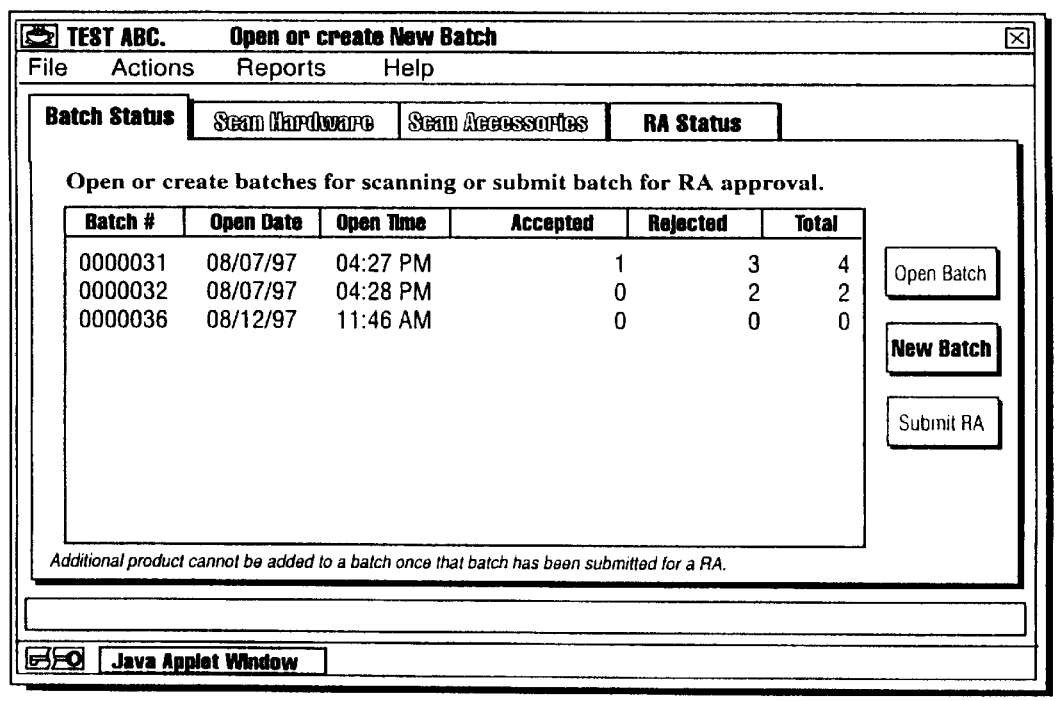

Upon verification of the location identification code and the password, the manufacturer side computer 230 may cause a screen such as is illustrated in FIG. 4B to be displayed at the return side computer 210. As shown in FIG. 4B, existing batches saved in memory at the manufacturer side computer 230 are listed. Existing batches are those for which return products have been scanned, but which have not yet been submitted for return authorization. Preferably, items can only be added or deleted from a batch up to the time that the batch is submitted for return authorization. In the present example implementation of the invention, once the batch is submitted for return authorization, it will no longer be displayed on the batch status screen, but can be viewed from the RA Status screen described below in connection with FIG. 4H.

It is possible to display a number of information items on the batch status screen in addition to the batch number. For example, the batch status screen shown in FIG. 4B displays the date and time the batch was opened, the total number of products that have been screened for return validation, the number of accepted items, and the number of rejected items. Of course, additional information could be displayed if desired.

A number of options are offered to the return center operator on the batch status screen illustrated in FIG. 4B. In particular, the return center operator may open an existing batch, create a new batch, or submit a batch to the manufacturer for return authorization. To open an existing batch, the desired batch may be selected in a conventional fashion by using a mouse to highlight the batch number and then clicking on the "Open Batch" button. Similarly, a highlighted batch may be submitted for return authorization by clicking the "Submit RA" button. A new batch can be created by clicking the "New Batch" button.

A batch must be set up prior to screening returned products for return authorization. Depending on user preference, the return center operator may establish a new batch for each pallet of returned products that is screened for return authorization, each bill of lading, or based on the date that the products are scanned. It is not necessary to limit the number of products that can be scanned for each batch.

Referring again to FIG. 3, when the return center operator either opens an existing batch or creates a new batch, control passes to function block 304. For a new batch, the manufacturer side computer 230 creates a batch header which includes information identifying the assigned batch number, any customer reference numbers, the return center address, the name and telephone number of a customer contact person, and the status of the batch (e.g., product entry stage, pending approval, approved, declined, RA assigned, etc.). A new batch number will be assigned each time "New Batch" is selected. If an existing batch is opened, the header information is retrieved from memory associated with the manufacturer side computer 230.

Once a batch is opened, the system is now ready to screen returned products. Depending on the type of product for which return authorization is sought, the return center operator selects either "Scan Hardware" or "Scan Accessories" by clicking the appropriate button (FIG. 4B).

Figure 4C:
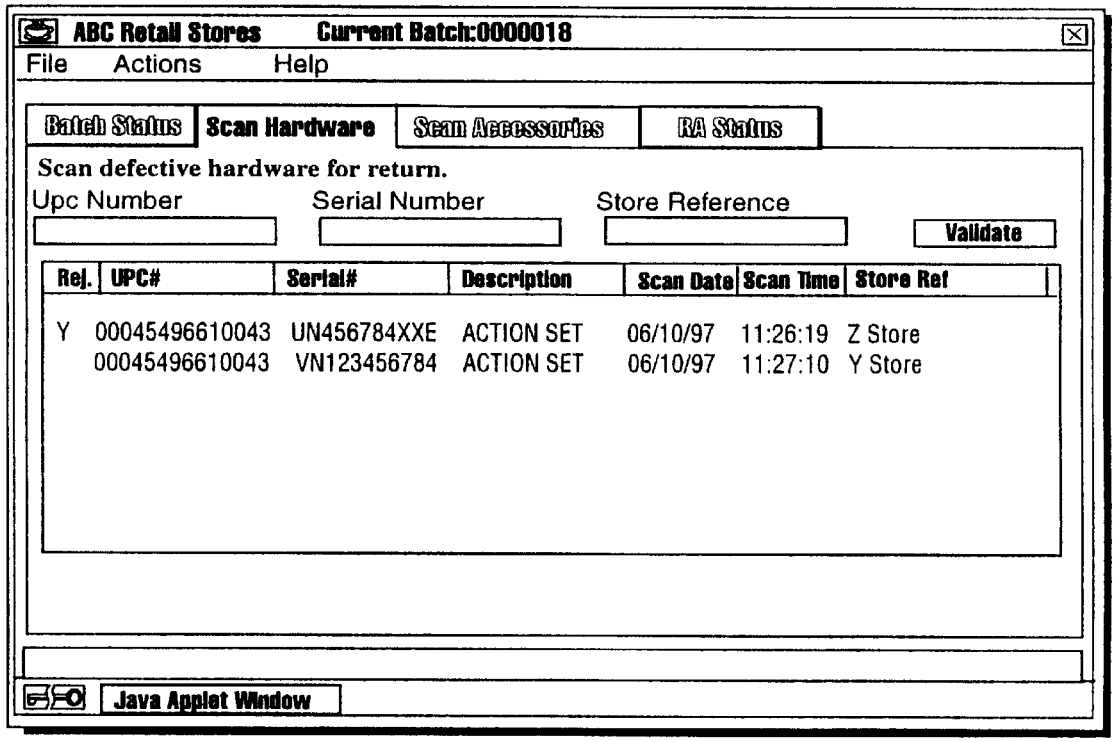

Referring now to FIG. 4C, to screen hardware product returns for compliance with return criteria, the return center operator is prompted to enter the Universal Product Code (UPC) number for the product, the product serial number, and a store reference code (if desired). This information may be entered by scanning bar codes on the product with wedge scanner 214 (FIG. 2), or alternatively by typing the information on the keyboard associated with return side computer 210. Other appropriate techniques may be employed as well. The user may then click the "Validate" button to instruct the manufacturer side computer 230 to screen the product for return approval.

As shown in FIG. 4C, the Scan Hardware screen then displays the submitted information including the UPC code, the serial number, a description of the product, the date and time it was entered, and the store reference if any. Again, other items could be displayed if desired.

Although various techniques may be used for validating the screened products for compliance with return criteria, the electronic registration system disclosed in the previously identified co-pending U.S. patent application Ser. No. 08/725,259, filed Oct. 2, 1996, is preferred for use in connection with the present invention. Briefly, such an electronic registration system establishes a database which then may be accessed at the time of product return to determine the date of original sale and other information pertinent to determining whether return requirements are met.

When the manufacturer side computer 230 receives UPC and serial number information for return validation, control passes to function block 306 of FIG. 3. The manufacturer side computer 230 then checks the electronic registration database to ensure that the identified product meets product return criteria, and posts the scanned information to a batch detail file. The batch detail file preferably includes the UPC number, the serial number, an indication of product quantity, and status (e.g., pending approval, approval good, error, or approval declined). The electronic registration database may then be edited to indicate that the product identified by the UPC code (function block 308) and serial number (function block 310) has been screened for return. Accordingly, the manufacturer side computer 230 can keep track of products that have already been screened to avoid multiple submissions of a single product for return.

There may be a number of reasons a hardware system will not qualify for return credit or replacement. For example, the warranty period may have expired, the serial number might not have been registered, an invalid serial number may have been received, the packaging may be missing, a major component of the product may be missing, or the item might be non-returnable as part of the conditions of sale. If the product does not qualify for return, the return center can retain the rejected product rather than ship it to the manufacturer, thereby saving the cost of freight for shipping a product that does not qualify for credit.

Figure 4D:
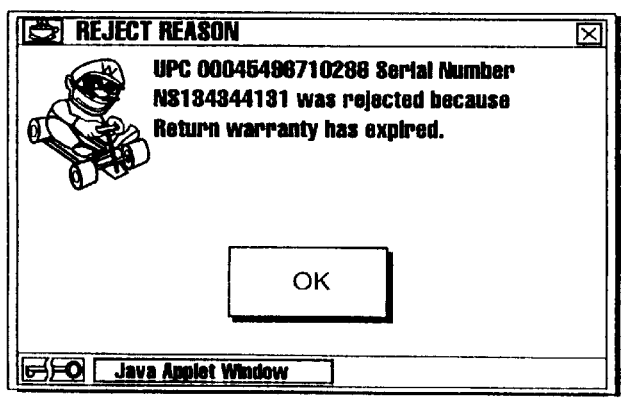

A note is displayed across the bottom of the screen of the Scan Hardware screen when a hardware unit does not qualify for return. The displayed message is preferably for the last item scanned. If the return center operator would like to review the reason a previously scanned item did not qualify for return credit, the operator may select "Actions" from the screen menu to see a list of available options. The operator may then select "Reasons" to see a description of the reason the unit was rejected. An example of a displayed reject reason is shown if FIG. 4D. Scanning may be resumed by pressing the <Esc> key on the return side computer keyboard to close the menu screen. The scanning process is repeated for each hardware item for which screening is sought.

Ideally, the return center operator stacks items qualifying for return on a shipping pallet or the like. Non-qualifying items should be stacked on a separate pallet. It will then be unnecessary for return center personnel to later sort through the products a second time to separate qualifying products from non-qualifying products.

Figure 4E:

The Scan Accessories display screen is illustrated in FIG. 4E. The return center operator is prompted to enter the quantity of the accessory that is to be scanned. For example, if return authorization is to be requested for three VHS cables, the operator will input "3" and then use the <TAB> button on the return side computer keyboard to advance the cursor to the UPC Number field. The UPC number may then be scanned or entered manually on the keyboard. If a Store Reference code is used it may be entered prior to clicking the "Validate" button.

Figure 4F:

Once pre-screening is completed for the hardware and accessories, the return center operator may move back to the "Batch Status" screen. The batch may then be submitted for return authorization by clicking the "Submit RA" button. Referring now to FIG. 4F, the return center operator is preferably prompted to enter the name and phone number of the person who should be contacted with information or questions concerning the return authorization request. If desired, a customer reference number (e.g., a bill of lading number, file number, invoice number, etc.) may be entered for an internal reference to identify the return authorization. If the information on the screen is not filled in or "Cancel" is selected, the batch will not be submitted for return authorization. However, the batch will continue to be visible from the "Batch Status" screen.

Figure 4G:
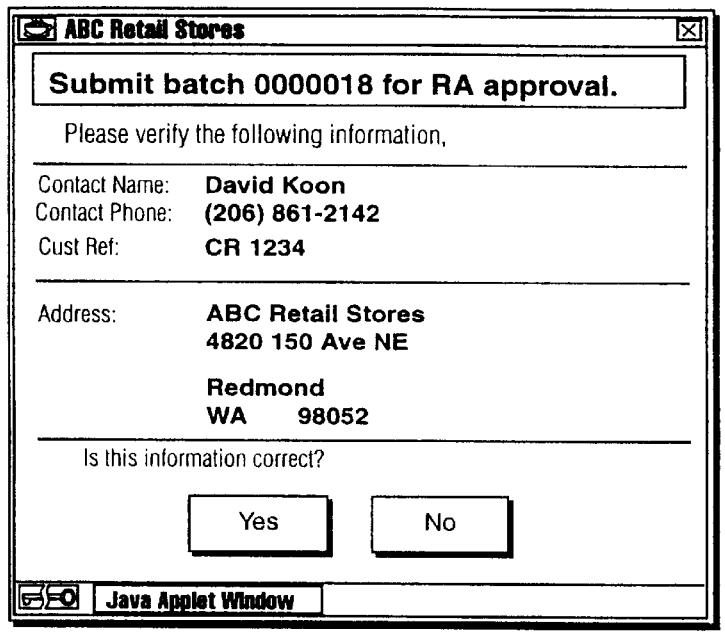

Referring again to FIG. 3, control goes to function block 312 upon submission of a return authorization request. First, the return center operator is asked to verify the contact information. An example of an appropriate contact verification screen for display on the return side computer 210 is shown in FIG. 4G. If the contact information is verified, the manufacturer side computer 230 re-validates the good scans included in the submitted batch. Control then proceeds to function block 314. If the good scans fail re-validation, control proceeds to function block 316, which flags the batch header with an error indication, and notifies the return center operator of the failure. Otherwise, control proceeds to function block 318 for automated approval.

Function block 320 checks to determine whether the automated approval process was successful. If not, an e-mail message may be sent to a manufacturer's representative for the particular return center (function block 322). The return authorization request may then be reviewed manually to determine whether the request should be approved (function block 324). If the manual review shows that the request was properly rejected, the batch is flagged with an indication that the request was rejected, and the return center is notified of the rejection (function block 326). However, if the request is approved, control passes to function block 328 to create a return authorization number and update the batch header to indicate the approved status. As indicated in FIG. 3, control may also pass to function block 328 by way of function block 320 if the automated approval process is successful.

Figure 4H:
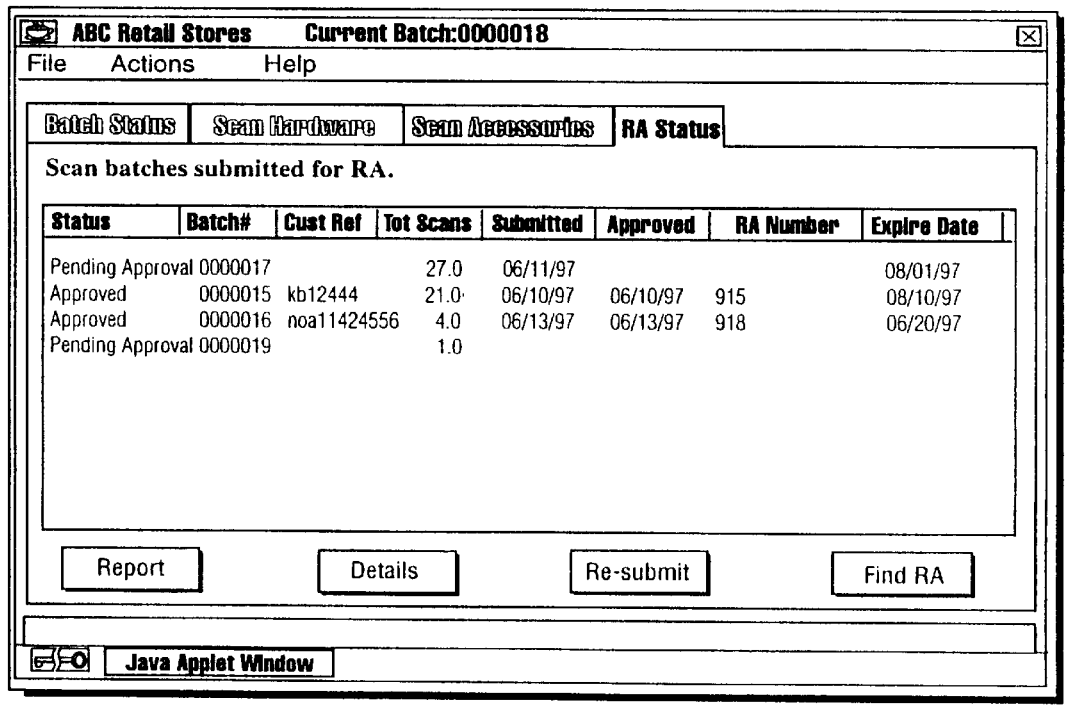

FIG. 4H illustrates an example of an RA Status display screen which may be used to inform the return center operator of the status of a return authorization request. As shown, the RA Status screen lists the authorization status (e.g., pending, approved rejected), the batch number, the customer reference number if any, the number of scans in the batch, the submission date, the approval date if applicable, the RA number if applicable, and the expiration date by which the return must be completed.

Once the RA has been submitted and approved, the system may also provide the dollar value of the product that is authorized for return. This dollar value may be based on the lower of 1) the gross invoice price paid by the Dealer for the product, less the value of all allowances and incentives given to the Dealer, or 2) the vendor's net product pricing at the time of the return. In most cases, the dealer may deduct the monetary value of authorized returns from any existing or future vendor invoices. Additionally, the system can be configured to comply with a vendor's specific returns policy and guidelines.

Figure 5A:
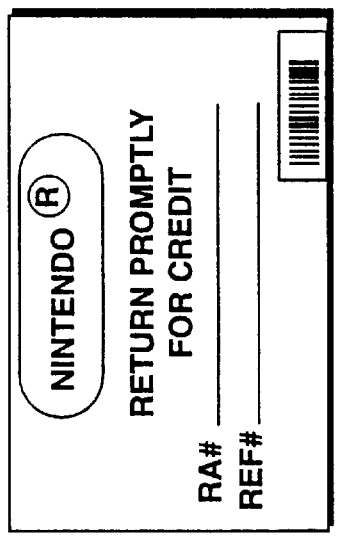
FIG. 5A further illustrates the batch return authorization label of FIG. 5.
Figure 5:
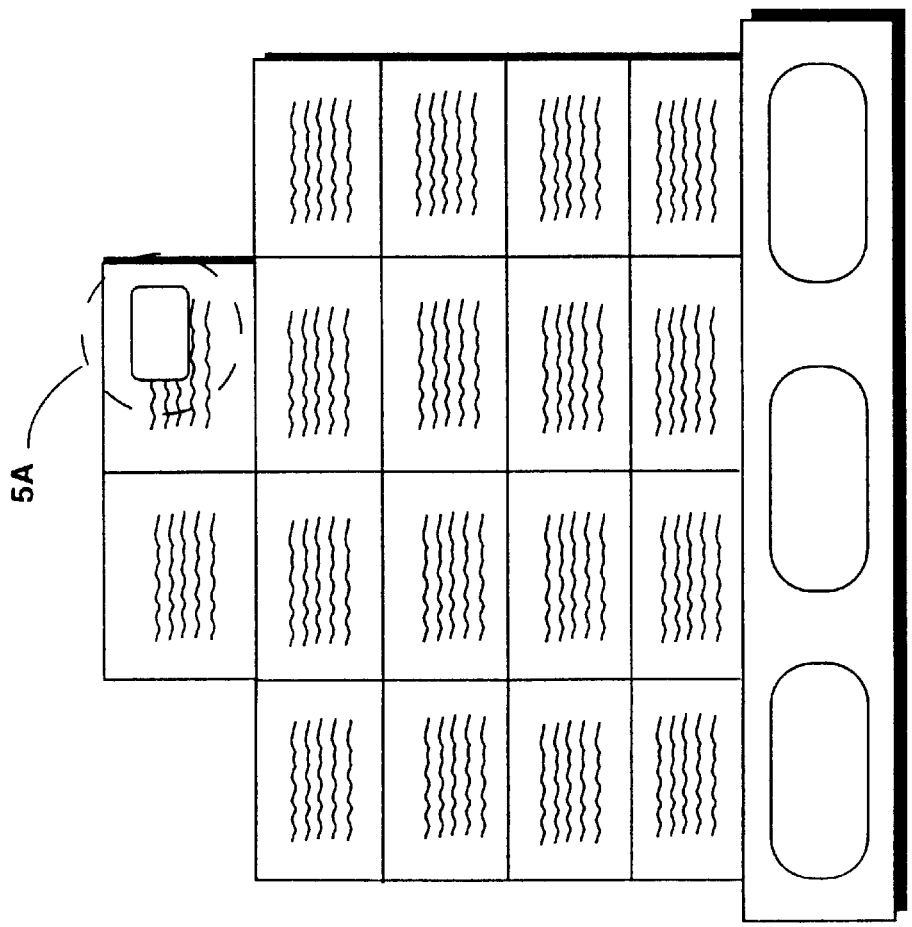
FIG. 5 is a plan view of a pallet on which a plurality of returned goods is stacked for return to a manufacturer, including a batch return authorization label which may be placed on the pallet.

The RA number should be placed on the products prior to shipping to the manufacturer for credit. Referring now to FIGS. 5 and 5A, the RA number listed on the RA Status display screen may be written on an adhesive label supplied by the manufacturer along with the customer reference number (if applicable). Alternatively, the printer 216 (FIG. 2) may be used to print labels upon receipt of a return authorization number. Such labels are preferably placed on all four sides of the shipping pallet, the pallet is shrink wrapped and shipped to the manufacturer. The pallet should be shipped immediately to guard against expiration of product return dates. Of course, other shipping containers may be used as well.

The return authorization labels provide an easy reference to personnel at the manufacturer warehouse and permit simple and efficient processing of the returned. Because the returned products are received in a batch and have been pre-approved for return credit, less work is required in reviewing the returned products to verify compliance with return criteria. As a result, the resources required to process the shipment are reduced, and the manufacturer is able to more quickly credit the return center for the returned products.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for efficient processing of product returns from a retailer's facility to a manufacturer's facility, comprising:

entering at the retailer's facility unique identifying information for each product for which return authorization is sought;

transmitting the unique identifying information to a general database for a determination of whether applicable return criteria are met for each product for which return authorization is sought;

obtaining a return authorization from the general database for products which qualify for return; and shipping the products which qualify for return along with an identification of the return authorization to the manufacturer's facility to obtain credit for the returned products.

2. The method of claim 1, wherein the unique identifying information is entered by scanning a bar code for the product.

3. The method of claim 1, wherein the general database is located at a remote location, and the transmitting step is accomplished by establishing electronic communication with the remote location.

4. The method of claim 3, wherein the remote location is a manufacturer facility for processing product returns.

5. The method of claim 4, wherein the general database includes a product registration database containing information received on purchased products including date of purchase, and further wherein the general database includes the applicable return criteria for the products.

6. The method of claim 1, wherein the return authorization is a return authorization number and wherein the shipping step includes labeling the return authorization number on a shipping package.

7. A method for pre-authorizing product returns from a retailer's facility to a manufacturer's facility comprising:

receiving from the retailer's facility unique identifying information for each product for which return authorization is sought;

evaluating the unique identifying information to determine whether applicable return criteria are met for each product for which return authorization is sought;

creating a return authorization for products which qualify for return and forwarding the return authorization to the retailer's facility, wherein an identification of the return authorization will accompany the products which qualify for return when the products are returned to the manufacturer's facility.

8. The method of claim 7, wherein the unique identifying information includes a universal product code and a product serial number, and wherein the evaluating step includes accessing a product registration database to verify that the identified product complies with return criteria.

9. The method of claim 7, wherein the receiving step obtains the unique identifying information by way of electronic communication.

10. An apparatus for obtaining pre-authorization of product returns from a retailer's facility to a manufacturer's facility, comprising a local computing system having an associated data entry device and display device located at the retailer's facility, and being capable of communicating with the manufacturer's facility, the data entry device being operable to enter unique identifying information for each product for which return pre-authorization is sought, the local computing system operating in response to the unique identifying information to communicate the product identifying information to the manufacturer's facility and, thereafter, operating in response to a return authorization received from the manufacturer's facility to display the return authorization on the display.

11. The apparatus of claim 10, wherein the data entry device includes a scanner operable to read a product bar code indicating at least one of a universal product code and a product serial number.

12. The apparatus of claim 11, wherein the data entry device further includes a keyboard for manual entry of the unique identifying information.

13. The apparatus of claim 10, wherein the local computing system communicates with the manufacturer's facility by way of an internet connection.

14. A method of reducing unauthorized returns of purchased products from a retailer's facility to a manufacturer's facility, comprising:

(a) maintaining a product information database remote from the retailer's facility for each purchased product, wherein the product information database includes return criteria for purchased products;

(b) transmitting unique product identification information from the retailer's facility to a host system having access to said product information database, wherein the unique product identification information uniquely identifies a product for which a return is sought;

(c) using the host system to access the product information database to determine a return criteria for the product based on the unique product identification information;

(d) determining whether the product qualifies for return based on the return criteria;

(e) transmitting to the retailer's facility a return qualification message if the product qualifies for return; and (f) accepting the product for return at the manufacturer's facility if the return qualification message has been transmitted to the retailer's facility.

15. A method of reducing unauthorized returns of purchased products from a retailer's facility to a manufacturer's facility, comprising:

(a) maintaining a product information database remote from the retailer's facility for each purchased product, wherein the product information database includes return criteria for purchased products;

(b) transmitting unique product identification information from the retailer's facility to a host system having access to the product information database, wherein the unique product identification information uniquely identifies a product for which a return is sought;

(c) accessing the database to determine a return criteria for the product based on the unique product identification information;

(d) determining whether the product qualifies for return based on the return criteria;

(e) transmitting to the retailer's facility a return qualification message if the product qualifies for return;

(f) accepting the product for return at the manufacturer's facility if the return qualification message has been transmitted to the retailer's facility; and (g) further including repeating steps (b) through (e) for a plurality of products for which return is sought, and transmitting a return authorization to the retailer's facility covering a batch of products which qualify for return, wherein accepting the product for return includes receiving the batch of products at the manufacturer's facility along with the return authorization.

16. The method of claim 15, wherein the manufacturer's facility is a manufacturer's facility for processing product returns.

17. The method of claim 16, wherein the retailer's facility is a retailer's central facility for processing product returns received from the retailer's retail outlets.

18. The method of claim 15, wherein the step of transmitting unique product identification information is accomplished by establishing electronic communication between the retailer's facility and the host system.

19. The method of claim 18, wherein establishing the electronic communication is achieved by way of an internet connection.

20. The method of claim 15, wherein the step of transmitting a return qualification message is accomplished by establishing electronic communication between the retailer's facility and the manufacturer's facility.

21. The method of claim 20, wherein establishing the electronic communication is achieved by way of an internet connection.

22. A method of reducing unauthorized returns of purchased products of different types from a retailer's facility to a manufacturer's facility, comprising:

(a) maintaining a general product information database, wherein the general product information database includes information indicating date of purchase for each purchased product;

(b) defining a particular return criteria for each of the different types of products;

(c) transmitting unique product identification information from the remote location to a host system having access to said general product database, wherein the unique product identification information uniquely identifies a product for which a return is sought;

(d) accessing the general product information database to determine a date of purchase for the product based on the unique product identification information;

(e) determining whether the product qualifies for return based on the date of purchase and the return criteria defined for the particular product type;

(f) transmitting to the retailer's facility a return qualification indicator if the product qualifies for return; and (g) accepting the product for return at the manufacturer's facility if the return qualification indicator has been sent to the retailer's facility.

23. A method of reducing unauthorized returns of purchased products of different types from a retailer's facility to a manufacturer's facility, comprising:

(a) maintaining a general product information database, wherein the general product information database includes information indicating date of purchase for each purchased product;

(b) defining a particular return criteria for each of the different types of products;

(c) transmitting unique product identification information from the remote location, wherein the unique product identification information uniquely identifies a product for which a return is sought;

(d) accessing the general product information database to determine at least a date of purchase for the product based on the unique product identification information;

(e) determining whether the product qualifies for return based on the date of purchase and the return criteria defined for the particular product type;

(f) transmitting to the retailer's facility a return qualification indicator if the product qualifies for return;

(g) accepting the product for return at the manufacturer's facility if the return qualification indicator has been sent to the retailer's facility; and (h) further including repeating steps (c) through (f) for a plurality of purchased products for which return is sought, and transmitting a return authorization to the retailer's facility covering a batch of products which qualify for return, wherein accepting the product for return includes receiving the batch of products at the manufacturer's facility along with the return authorization.

24. The method of claim 23, wherein the manufacturer's facility is a manufacturer's facility for processing product returns.

25. The method of claim 24, wherein the retailer's facility is a retailer's central facility for processing product returns received from the retailer's retail outlets.

26. The method of claim 23, wherein the step of transmitting unique product identification information includes establishing electronic communication between the retailer's facility and the host system.

27. The method of claim 26, wherein establishing the electronic communication is achieved by way of an internet connection.

28. The method of claim 23, wherein the step of transmitting a return qualification indicator is accomplished by establishing electronic communication between the host system and the retailer's facility.

29. The method of claim 28, wherein establishing the electronic communication is achieved by way of an internet connection.

30. The method of claim 23, wherein the step of defining a return criteria for each of the plurality of different types of products includes defining different return criteria for products manufactured by different manufacturers.

31. The method of claim 23, wherein the step of defining a return criteria for each of the plurality of different types of products includes defining different return criteria for products sold by different retailers.

32. A method of handling product returns at a retailer's facility for return to a manufacturer's facility, comprising:

transmitting a unique product identifier from the retailer's facility to a host system having access to a product database containing information on products purchased from the retailer, wherein the unique product identifier uniquely identifies a product for which a return is sought;

obtaining from the host system a return qualification message for the product if the product is determined by the host system to qualify for return based on the unique product identifier and a predefined return criteria for the product; and returning the product to the manufacturer's facility if the return qualification message is received from the host system.

33. The method of claim 32, wherein the manufacturer's facility is a manufacturer's facility for processing product returns.

34. The method of claim 33, wherein the retailer's facility is a retailer's central facility for processing product returns received from the retailer's retail outlets.

35. The method of claim 32, wherein the step of transmitting is accomplished by establishing electronic communication between the host system and the retailer's facility.

36. The method of claim 35, wherein establishing the electronic communication is achieved by way of an internet connection.

37. The method of claim 32, wherein the step of obtaining a return qualification message from the host system is accomplished by establishing electronic communication between the host system and the retailer's facility.

38. The method of claim 37, wherein establishing the electronic communication is achieved by way of an internet connection.

39. A method of handling a batch of product returns at a retailer's facility for return to a manufacturer's facility, wherein the batch of products includes different types of products, the method comprising:
transmitting a unique product identifier to a host system for each product in the batch of products for which return is sought, wherein the host system has access to a general database containing information on said products;
obtaining in response to the transmitting step return qualification indicators for the products in the batch of products, respectively, wherein the return qualification indicators indicate for each product in the batch whether the product has been determined by the host system to qualify for return based on the unique product identifier and a predefined return criteria for each of the different types of products.
separating the products which qualify for return from the batch of products to define a returnable batch of products based on the return qualification indicators; and
returning the returnable batch of products to the manufacturer's facility.

40. The method of claim 39, wherein separating includes receiving a batch return authorization code for the returnable batch of products, and wherein returning the returnable batch of products includes labeling a shipping package containing the returnable batch of products with the batch return authorization code.

41. The method of claims 39, wherein the unique identifying information is obtained from the product by scanning a bar code on the product.

42. The method of claim 39, wherein the step of transmitting a unique product identifier is accomplished by establishing electronic communication between the host system and the retailer's facility.

43. A system for efficient processing of returns of purchased products from a retailer's facility to a manufacturer's facility, comprising;
a first information processing system having a product registration database containing information on purchased products and return criteria for purchased products;
a second information processing system located at the retailer's facility operable to receive input on a purchased product sought to be returned and to transmit to the first information processing system a unique product identifier based on the input;
the first information processing system being operable to:
receive the unique product identifier;
access the product registration database and determine whether the product qualifies for return based on the unique product identifier and the return criteria; and
transmit to the first information processing system a return qualification indicator if the product qualifies for return.

44. A system as defined in claim 43, wherein the second information processing system includes a display which is operable to display the return qualification indicator once received from the first information processing system.

45. A system as defined in claim 43, wherein the first and second information processing systems are operable to establish a communication link therebetween by an internet connection.

46. A system as defined in claim 43, wherein the first information processing system is located at the manufacturer's facility.

47. A system as defined in claim 46, wherein the second information processing system is located at a retailer's central facility for processing product returns received from the retailer's retail outlets.

48. A system as defined in claim 43, wherein the second information processing system includes a product scanner operable to generate the input by scanning the product.

49. A system as defined in claim 43, wherein the scanner is operable to read a product bar code indicating at least one of a universal product code and a product serial number.

50. A system for efficient processing of returns of different types of purchased products to a manufacturer's facility, the system comprising;
a central information processing system having product registration information on purchased products, wherein the information indicates at least a date of purchase for the purchased products, the central information processing system further including return criteria for each of the different types of products;
a remote information processing system located at the retailer's facility, the remote information processing system being operable to receive input on a purchased product sought to be returned and to transmit to the central information processing system a unique product identifier based on the input;
the central information processing system being operable to:
receive the unique product identifier;
access the product registration database to determine a date of purchase based on the unique product identifier;
determine whether the product qualifies for return based on the date of purchase and the particular return criteria for the particular product type; and
transmit to the remote information processing system a return qualification indicator if the product qualifies for return.

51. A system as defined in claim 50, wherein the remote information processing system includes a display which is operable to display the return qualification indicator once received from the central information processing system.

52. A system as defined in claim 50, wherein the central and the remote information processing systems are operable to establish a communication link therebetween by an internet connection.

53. A system as defined in claim 50, wherein the central information processing device is located at a manufacturer's facility for processing returns.

54. A system as defined in claim 53, wherein a plurality of the remote information processing systems are located at a plurality of retailer's facilities, respectively.

55. A system as defined in claim 50, wherein the remote information processing system includes a product scanner operable to generate the input by scanning the product.

56. A system as defined in claim 55, wherein the scanner is operable to read a product bar code indicating at least one of a universal product code and a product serial number.

* * * * *